(12) United States Patent
Chen et al.

(10) Patent No.: US 7,835,953 B2
(45) Date of Patent: Nov. 16, 2010

(54) METHOD AND STRUCTURE FOR MONITORING MOVING OBJECTS

(75) Inventors: Shyh-Kwei Chen, Chappaqua, NY (US); Kun-Lung Wu, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1481 days.

(21) Appl. No.: 10/671,932

(22) Filed: Sep. 29, 2003

(65) Prior Publication Data

US 2005/0071083 A1   Mar. 31, 2005

(51) Int. Cl.
*G06Q 10/00* (2006.01)
(52) U.S. Cl. .................. 705/28; 707/3; 705/7; 705/10
(58) Field of Classification Search .................. 705/28; 707/104.1; 702/102
See application file for complete search history.

(56) References Cited

U.S. PATENT DOCUMENTS

| | | | | | |
|---|---|---|---|---|---|
| 4,114,601 | A | * | 9/1978 | Abels | 600/20 |
| 4,774,657 | A | * | 9/1988 | Anderson et al. | 1/1 |
| 5,190,059 | A | * | 3/1993 | Fabian et al. | 128/899 |
| 5,315,709 | A | * | 5/1994 | Alston et al. | 1/1 |
| 5,513,110 | A | * | 4/1996 | Fujita et al. | 701/207 |
| 5,519,818 | A | * | 5/1996 | Peterson | 345/642 |
| 5,560,007 | A | * | 9/1996 | Thai | 1/1 |
| 5,560,014 | A | * | 9/1996 | Imamura | 717/108 |
| 5,664,172 | A | * | 9/1997 | Antoshenkov | 707/700 |
| 5,664,173 | A | * | 9/1997 | Fast | 707/694 |
| 5,745,894 | A | * | 4/1998 | Burrows et al. | 1/1 |
| 5,761,652 | A | * | 6/1998 | Wu et al. | 1/1 |
| 5,778,354 | A | * | 7/1998 | Leslie et al. | 1/1 |
| 5,812,996 | A | * | 9/1998 | Rubin et al. | 1/1 |
| 5,838,365 | A | * | 11/1998 | Sawasaki et al. | 348/169 |
| 5,873,079 | A | * | 2/1999 | Davis et al. | 1/1 |
| 5,884,304 | A | * | 3/1999 | Davis et al. | 1/1 |
| 5,884,307 | A | * | 3/1999 | Depledge et al. | 1/1 |
| 5,893,088 | A | * | 4/1999 | Hendricks et al. | 707/696 |
| 5,903,876 | A | * | 5/1999 | Hagemier | 705/19 |
| 5,915,251 | A | * | 6/1999 | Burrows et al. | 707/700 |
| 5,930,785 | A | * | 7/1999 | Lohman et al. | 1/1 |
| 5,931,824 | A | * | 8/1999 | Stewart et al. | 604/358 |
| 5,953,707 | A | * | 9/1999 | Huang et al. | 705/10 |
| 5,961,572 | A | * | 10/1999 | Craport et al. | 701/207 |
| 5,963,956 | A | * | 10/1999 | Smartt | 1/1 |
| 6,003,016 | A | * | 12/1999 | Hagemier | 705/19 |

(Continued)

OTHER PUBLICATIONS

"Japan sensor array can image full hemisphere without PC Help", Apr. 15, 2002, AsiaPulse News.*

(Continued)

*Primary Examiner*—Matthew S Gart
*Assistant Examiner*—Talia Crawley
(74) *Attorney, Agent, or Firm*—McGinn IP Law Group, PLLC

(57) ABSTRACT

A method and structure for monitoring continual queries over moving objects, including identifying a query region in a digital format. Each query region is strictly covered by at least one shingle such that each query region is completely covered by the at least one shingle and no section of any of the at least one shingle falls outside the query region.

24 Claims, 10 Drawing Sheets

U.S. PATENT DOCUMENTS

| | | | | |
|---|---|---|---|---|
| 6,038,559 | A * | 3/2000 | Ashby et al. | 1/1 |
| 6,061,677 | A * | 5/2000 | Blinn et al. | 1/1 |
| 6,076,007 | A * | 6/2000 | England et al. | 600/424 |
| 6,078,899 | A * | 6/2000 | Francisco et al. | 705/19 |
| 6,088,648 | A * | 7/2000 | Shah et al. | 701/117 |
| 6,092,115 | A * | 7/2000 | Choudhury et al. | 709/235 |
| 6,105,019 | A * | 8/2000 | Burrows | 1/1 |
| 6,141,656 | A * | 10/2000 | Ozbutun et al. | 1/1 |
| 6,154,219 | A * | 11/2000 | Wiley et al. | 345/587 |
| 6,175,835 | B1 * | 1/2001 | Shadmon | 707/696 |
| 6,195,656 | B1 * | 2/2001 | Ozbutun et al. | 1/1 |
| 6,199,201 | B1 * | 3/2001 | Lamping et al. | 717/114 |
| 6,205,447 | B1 * | 3/2001 | Malloy | 1/1 |
| 6,289,334 | B1 * | 9/2001 | Reiner et al. | 1/1 |
| 6,298,170 | B1 * | 10/2001 | Morita et al. | 382/278 |
| 6,353,819 | B1 * | 3/2002 | Edwards et al. | 1/1 |
| 6,353,832 | B1 * | 3/2002 | Acharya et al. | 1/1 |
| 6,366,206 | B1 * | 4/2002 | Ishikawa et al. | 340/573.1 |
| 6,400,272 | B1 * | 6/2002 | Holtzman et al. | 340/572.1 |
| 6,424,262 | B2 * | 7/2002 | Garber et al. | 340/572.3 |
| 6,438,528 | B1 * | 8/2002 | Jensen et al. | 705/44 |
| 6,470,287 | B1 * | 10/2002 | Smartt | 702/102 |
| 6,487,549 | B1 * | 11/2002 | Amundsen | 1/1 |
| 6,510,423 | B1 * | 1/2003 | Ichikawa et al. | 1/1 |
| 6,529,903 | B2 * | 3/2003 | Smith et al. | 1/1 |
| 6,546,373 | B1 * | 4/2003 | Cerra | 705/19 |
| 6,571,250 | B1 * | 5/2003 | Hara | 1/1 |
| 6,591,270 | B1 * | 7/2003 | White | 1/1 |
| 6,600,418 | B2 * | 7/2003 | Francis et al. | 340/572.1 |
| 6,636,849 | B1 * | 10/2003 | Tang et al. | 1/1 |
| 6,640,214 | B1 * | 10/2003 | Nambudiri et al. | 705/26 |
| 6,669,089 | B2 * | 12/2003 | Cybulski et al. | 235/385 |
| 6,735,590 | B1 * | 5/2004 | Shoup et al. | 1/1 |
| 6,768,419 | B2 * | 7/2004 | Garber et al. | 340/572.4 |
| 6,809,645 | B1 * | 10/2004 | Mason | 340/572.1 |
| 6,861,954 | B2 * | 3/2005 | Levin | 340/572.1 |
| 6,900,731 | B2 * | 5/2005 | Kreiner et al. | 340/572.1 |
| 7,010,507 | B1 * | 3/2006 | Anderson et al. | 705/31 |
| 7,010,522 | B1 * | 3/2006 | Jagadish et al. | 1/1 |
| 7,019,650 | B2 * | 3/2006 | Volpi et al. | 340/572.1 |
| 7,142,118 | B2 * | 11/2006 | Hamilton et al. | 340/572.1 |
| 7,155,402 | B1 * | 12/2006 | Dvorak | 705/10 |
| 7,177,829 | B1 * | 2/2007 | Wilson et al. | 705/31 |
| 7,236,173 | B2 * | 6/2007 | Chithambaram et al. | 345/440 |
| 7,307,530 | B2 * | 12/2007 | Fabian et al. | 340/572.1 |
| 7,557,710 | B2 * | 7/2009 | Sanchez et al. | 340/572.1 |
| 2002/0007360 | A1 * | 1/2002 | Hawkinson | 707/4 |
| 2002/0067263 | A1 * | 6/2002 | Tafoya et al. | 340/572.1 |
| 2002/0143320 | A1 * | 10/2002 | Levin | 606/1 |
| 2003/0066537 | A1 * | 4/2003 | Fabian et al. | 128/899 |
| 2003/0105394 | A1 * | 6/2003 | Fabian et al. | 600/407 |
| 2003/0187867 | A1 * | 10/2003 | Smartt | 707/102 |
| 2004/0084525 | A1 * | 5/2004 | Kreiner et al. | 235/384 |
| 2004/0129279 | A1 * | 7/2004 | Fabian et al. | 128/899 |
| 2004/0201479 | A1 * | 10/2004 | Garber et al. | 340/572.1 |
| 2004/0250819 | A1 * | 12/2004 | Blair et al. | 128/899 |
| 2007/0093709 | A1 * | 4/2007 | Abernathie | 600/407 |
| 2007/0290030 | A1 * | 12/2007 | Fox et al. | 235/375 |

OTHER PUBLICATIONS

Paradigm and International Dispatch Center-IDC-to Co-Market Wireless Location Technology Solution, Apr. 19, 2001, Business Wire, p. 2250.*

* cited by examiner

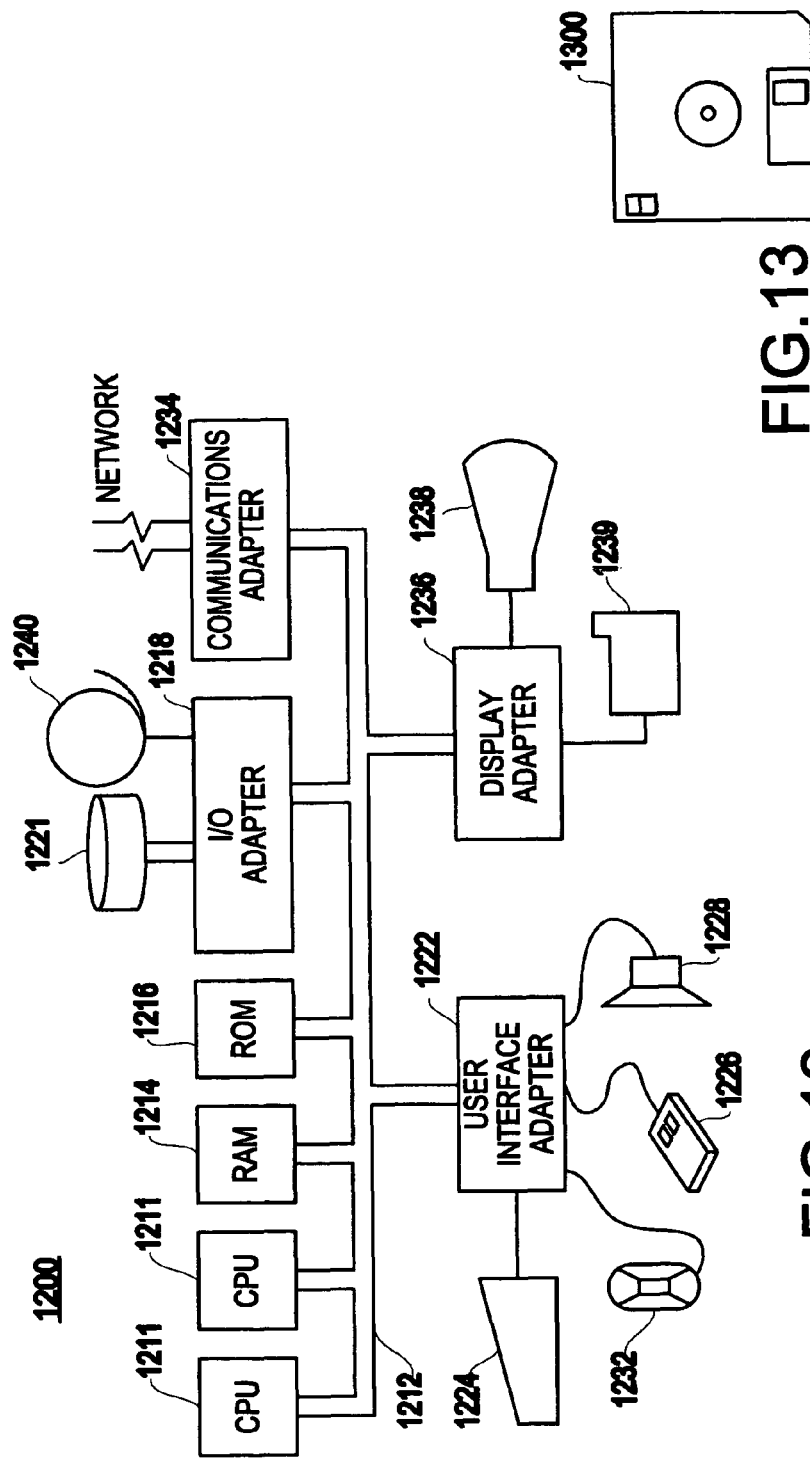

METHOD AND STRUCTURE FOR MONITORING MOVING OBJECTS

CROSS-REFERENCE TO RELATED APPLICATIONS

The present Application is related to the following co-pending application:

U.S. patent application Ser. No. 10/671,938, filed on Sep. 29, 2003, to Chen et al., entitled "System and Method for Monitoring Events Against Continual Range Queries", assigned to the present assignee, and incorporated herein by reference; and U.S. patent application Ser. No. 10/673,651, filed on Sep. 29, 2003, to Chen et al, entitled "System and Method for Indexing Queries, Rules and Subscriptions", both assigned to the present assignee, and both incorporated herein by reference.

BACKGROUND OF THE INVENTION

1. Field of the Invention

The present invention generally relates to providing location-aware (or location-dependent) services in a mobile environment. More specifically, a query indexing system and method that allow the user of this invention to periodically and incrementally locate all the moving objects inside the boundaries of continual range queries. "Incrementally" may be defined as skipping certain query evaluations by filtering out a subset of moving objects based on the relative movements from the last positions with respect to query boundaries.

2. Description of the Related Art

Location-aware (or location-dependent) services have become possible and emerging recently, thanks to the advances in mobile computing and location-sensing technologies, such as the global positioning system (GPS). These services can improve the quality of life by adding location-awareness to many objects of interest, such as humans, taxi cabs, ambulances, laptops, airplanes, trains and cargo ships. Basically, any object that moves can be equipped with location-awareness and monitored.

One of the most fundamental technical problems for providing location-aware services is to monitor and provide fast answers to continual range queries that locate the moving objects inside the query boundaries. With the results of continual range queries readily available, various kinds of location-aware services can be provided. For example, a taxi cab service company can dispatch a taxi cab to a customer at a specific location using the result from a continual range query such as: "Finding all the taxi cabs currently located within five blocks away from that specific location." The range queries are termed "continual" because they are repeatedly evaluated in order to provide the most up-to-date answers as objects continuously to move around. Each range query specifies the boundaries of a region.

An efficient index is usually needed for monitoring numerous continual range queries over a large number of moving objects. There are generally two different indexing approaches. One is to index the moving objects, and the other is to index the range queries.

Various attempts have been proposed to build an index on the moving objects, such as the following:

"Indexing moving objects," by P. K. Agarwal et al., in *Proceedings of ACM Symposium on Principles of Database Systems,* 2000;

"On indexing mobile objects," by G. Kollios et al., in *Proceedings of ACM Symposium on Principles of Database Systems,* 1999;

"Novel approaches to the indexing of moving object trajectories," by D. Pfoser et al., in *Proceedings of Very Large Data Bases,* 2000; and "Indexing the positions of continuously moving objects," by S. Saltenis et al., in *Proceedings of ACM SIGMOD,* 2000.

However, because objects may continuously move in unpredictable speed and direction, it is very difficult to maintain an effective index on the moving objects. Changes in object locations demand updates to the object index, greatly degrading its performance. As a result, certain constraints are usually placed on the moving speed or direction of an object, significantly limiting the applicability of the object index.

In contrast, it is more effective to build an index on the range queries because continual range queries change less frequently. With query indexing, the problem of monitoring continual range queries becomes the following: Given a set of range queries and a set of moving objects, continually determine the set of objects that are located inside the boundaries of each range query.

The query index is used to quickly retrieve all the range queries that cover a given object. Periodically, all the range queries are reevaluated by identifying all the objects covered by each range query taking into account their latest locations. In order for the results to be useful, the time period between two consecutive reevaluations must be short. As a result, the time for a query reevaluation must be as brief as possible. Moreover, it is important that a query indexing method can take advantage of incremental changes in object locations because some of the objects may not have moved outside a query boundaries since the last reevaluation. This invention discloses an effective query indexing system and method for monitoring continual range queries over moving objects.

Query indexing was not used in the moving object environment until recently. In "Query indexing and velocity constrained indexing: scalable techniques for continuous queries on moving objects," *IEEE Transactions on Computers,* 51:1124-1140, October 2002, S. Prabhakar et al. proposed a query indexing method using an R-tree. However, in order to avoid excessive location updates, a safe region for each mobile object was defined. Unfortunately, determining a safe region requires intensive computation. Moreover, a constraint is imposed on the maximum velocity of a moving object to compute the safe regions.

In "Efficient evaluation of continuous range queries on moving objects," *Proceedings of 13$^{th}$ International Conference on Database and Expert Systems Applications,* 2002, D. V. Kalashnikov et al. proposed a grid cell-based query indexing method, which was shown to outperform an R-tree-based query index. The monitoring area is partitioned into non-overlapping grid cells. Each cell maintains two lists: full and partial. The full list stores the IDs of queries that completely cover the cell, while the partial list maintains the IDs of queries that partially intersect with the cell.

However, the need to use the partial lists has a significant drawback. The fact that an object is inside a cell does not imply that it is inside the boundaries of a query stored in the partial list of the cell. This forces continual comparisons of object locations against the boundaries of queries. As a result, it cannot take advantage of the incremental changes in object locations. Even if an object has not moved outside a cell, boundary comparisons against all the queries stored in a partial list are still needed.

As a result, a need has been recognized to have a better and more effective query indexing method that:

(1) does not impose any limit on the moving speed or direction of an object, and (2) can take advantage of incremental changes in object locations.

Those skilled in the art will appreciate that various query indexing methods have been proposed to efficiently matching events in the context of predicate matching (e.g., E. Hanson et al., "Selection predicate indexing for active databases using interval skip lists," *Information Systems*, 21(3):269-298, 1996) and pub/sub (e.g., M. K. Aguilera et al., "Matching events in a content-based subscription system," *Proceedings of Symposium on Principles of Distributed Computing*, 1999; F. Fabret et al, "Filtering algorithms and implementation for very fast publish/subscribe systems," *Proceedings of the ACM SIGMOD*, 2001).

However, these query indexing methods are mostly based on equality predicates, not range predicates. Thus, they are not generally applicable for the evaluation of continual range queries over moving objects.

Those skilled in the art will also appreciate that, although range queries can be treated as spatial objects such as rectangles, traditional spatial indexing methods, such as R-trees (e.g., A. Guttman, "R-trees: A dynamic index structure for spatial searching," *Proceedings of ACM SIGMOD*, 1984; V. Gaede et al., "Multidimensional access methods," *ACM Computing Surveys*, 30(2):170-231, 1998), are not effective for monitoring moving objects because they are mostly disk-based indexing methods.

They are generally too slow to be effective for monitoring continual range queries over a large number of moving objects. Moreover, the performance of an R-tree quickly degenerates when the ranges of continual queries start to overlap one another (V. Gaede et al., "Multidimensional access methods," *ACM Computing Surveys*, 30(2):170-231, 1998; E. Hanson et al., "Selection predicate indexing for active databases using interval skip lists," *Information Systems*, 21(3):269-298, 1996).

SUMMARY OF THE INVENTION

In view of the foregoing problems, drawbacks, and disadvantages of the conventional systems, it is an exemplary feature of the present invention to provide a query indexing structure (and method) which allows the user of this invention to periodically and incrementally locate all the moving objects inside the boundaries of continual range queries. In this context, "incrementally" means skipping certain query evaluations by filtering out a subset of moving objects based on the relative movements since the last positions with respect to query boundaries.

It is, therefore, an exemplary purpose of the present invention to provide a structure and method for a query indexing structure (and method) which allows the users of this invention to periodically and incrementally locate all the moving objects inside the boundaries of continual range queries.

Hence, in a first aspect of the present invention, described herein is a method and structure that monitors continual queries over moving objects, identifying a query region in a digital format. Each query region is strictly covered by at least one shingle, such that each query region is completely covered by the at least one shingle and no section of any of the at least one shingle falls outside the query region.

In a second aspect of the present invention, described herein is a service based on monitoring continual queries over moving objects, wherein the service includes at least one of: providing a monitoring of moving objects against continual queries, using the just-described method; providing a result of the monitoring using the method; and using a result of the monitoring using the method.

In a third aspect of the present invention, described herein is a signal-bearing medium tangibly embodying a program of machine-readable instructions executable by a digital processing apparatus to perform the above-described method of monitoring continual queries over moving objects.

BRIEF DESCRIPTION OF THE DRAWINGS

The foregoing and other exemplary features, aspects and advantages will be better understood from the following detailed description of a preferred embodiment of the invention with reference to the drawings, in which:

FIG. 12 illustrates an exemplary hardware/information handling system 1200 for incorporating the present invention therein; and FIG. 13 illustrates a signal bearing medium 1300 (e.g., storage medium) for storing steps of a program of a method according to the present invention.

DETAILED DESCRIPTION OF A PREFERRED EMBODIMENT OF THE INVENTION

Figure 1:
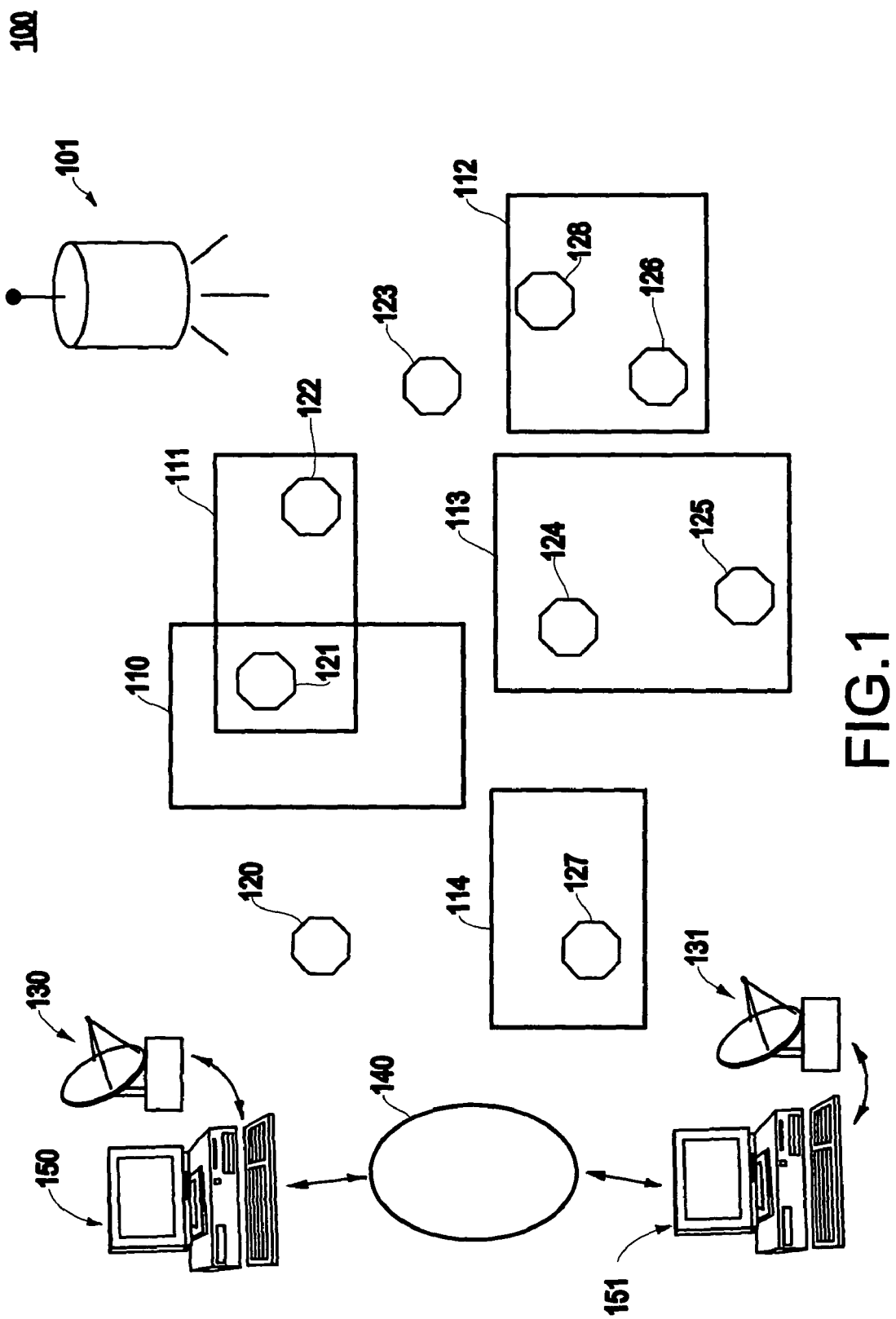
FIG. 1 shows the system block diagram of a mobile environment 100 where a plurality of continual range queries can be monitored against a large number of moving objects.

Referring now to the drawings, and more particularly to FIG. 1, a preferred embodiment of the present invention will now be described. FIG. 1 shows an exemplary system block diagram 100 of a mobile environment where a plurality of continual range queries 110-114 can be monitored against a large number of moving objects, exemplarily shown as objects 120-128. A satellite 101 can be used to relay and broadcast data to the receivers 130, 131 on the ground. On the ground, are many mobile objects 120-128, along with regional computer servers 150,151, which servers are equipped with wireless receivers 130, 131.

The range queries 110-114 are shown as rectangles in a two dimensional space in this exemplary preferred embodiment.

However, those skilled in the art will appreciate that they can be of other shapes, such as circles in a 2D space, cubes or spheres in a 3D space.

These continual range queries 110-114 specify the regions that are to be monitored. The query results are all the objects that are located inside individual query regions. The boundaries of these range queries are maintained by one or more regional computer servers 150, 151. These regional servers are connected via a communication network 140.

The moving objects 120-128 are equipped with location-awareness devices, such as Global Positioning System (GPS) devices. The locations of moving objects 120-128 are also maintained by one or more regional computer servers 150, 151. Changes in object locations are reported to the computer servers 150, 151 by the moving objects 120-128, typically via wireless links 130, 131.

Figure 2:
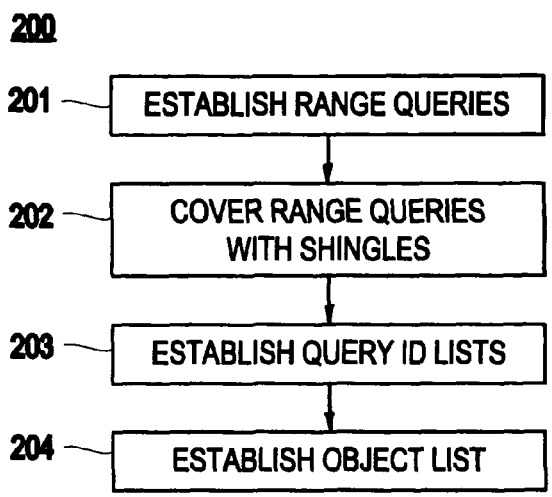
FIG. 2 shows a summary flow chart 200 of an exemplary preferred embodiment of the present invention.

FIG. 2 shows in summary format 200 the exemplary shingle-based query indexing (SQI) method disclosed herein for effectively monitoring numerous continual range queries over a large number of moving objects. A shingle is a tile-like object, not necessarily of rectangular shape, that is conventionally laid in overlapping rows to cover an area. In the context of the present invention, a shingle may be defined as a digital representation of a tile-like object laid to cover a digital representation of an area (e.g., a geographical area), without necessarily being laid in overlapping rows.

A core idea of the present invention is to use one or more shingles to cover each range query. In contrast to cells, the shingles of the present invention may overlap with one another, similar to shingles used to cover the roof of a house. With SQI, there is no ambiguity as to whether or not a point is covered by a query if it falls inside one of the shingles that cover the query. Hence, incremental reevaluation approach can be easily pursued.

Computation can be saved for those objects that have not moved outside a shingle since the last reevaluation. Since an object can be covered by more than one shingles, an exemplary efficient algorithm to determine the set of shingles that cover an object is first provided. Incremental reevaluation is accomplished by using the difference between the sets of covering shingles for the new location and old location.

To implement an SQI, a set of virtual shingles are predefined. Each virtual shingle has a unique bottom-left corner (a, b), width and height. A shingle stays virtual until it is used to cover a range query. At that time, it is considered as having been activated.

In steps 201 and 202, when a range query is to be inserted, a set of virtual shingles to cover the range query is first found. Then, in step 203, the query ID is inserted into each of the ID lists associated with the covering shingles. There are many ways that could be used to cover a query with shingles.

In a preferred exemplary embodiment, a simple yet systematic approach is presented. First, a strip rectangle of height k from the bottom of the query rectangle is drawn and moved upwards. For the last strip, the bottom of the strip is allowed to overlap with a previous one. For each strip rectangle, virtual shingles are used to cover it from the left side, moving towards the right side. For the last shingle, the right side is lined up and the left side of the shingle is allowed to overlap with a previous covering shingle.

To search all the queries that cover a given object, the covering shingles of the object are first computed and then, from these covering shingles, are all the queries that cover the object. An exemplary efficient algorithm to enumerate all the covering shingles for any given object location is presented below. This enumeration algorithm is made possible by two important properties: constant size, and identical gap pattern.

The number of covering shingles is the same for all object locations. If the IDs of the covering shingles are sorted in an increasing order, the gap between any two shingles of matching positions is identical for any two locations.

A complete query reevaluation is done as follows. For each object, the covering shingles for it are found, and then all the queries that cover these shingles are found. The object ID is then stored in the object lists associated with these queries. At the end, as shown in step 204, the object lists are the query results.

However, incremental reevaluation is presented to save computation, as follows. For incremental reevaluation, the covering shingles for the new location and the old location are first computed. For all the covering shingles of the new location, but not of the old, an instance of the object is inserted into the object lists pointed to by the queries that cover these shingles. This accounts for the case that the object has moved into these shingles.

For all the covering shingles of the old location, but not of the new location, an instance of the object is deleted from the object lists pointed to by the queries that cover these shingles. This accounts for the case that the object has moved out of these shingles. For any covering shingle that is both of the new location and the old location, nothing needs to be done. It accounts for the case that the object has remained inside the boundaries of these shingles.

The system and method for monitoring continual range queries against moving objects consist mainly of an effective query indexing method. With this query index, periodically each new object location is used to find all the queries that cover it. The object ID is then stored into an object list (OL) associated each of the covering queries.

After all object locations are processed, a complete new set of query results is available. In other words, object list OL(q) contains all the objects currently located inside the boundaries of query q. The data structure for the query index and its associated operations are stored as computer executable programs in one or more of the regional servers 150,151 in FIG. 1. The results of these continual range queries can be used to provide various kinds of location-aware services.

Figure 3:
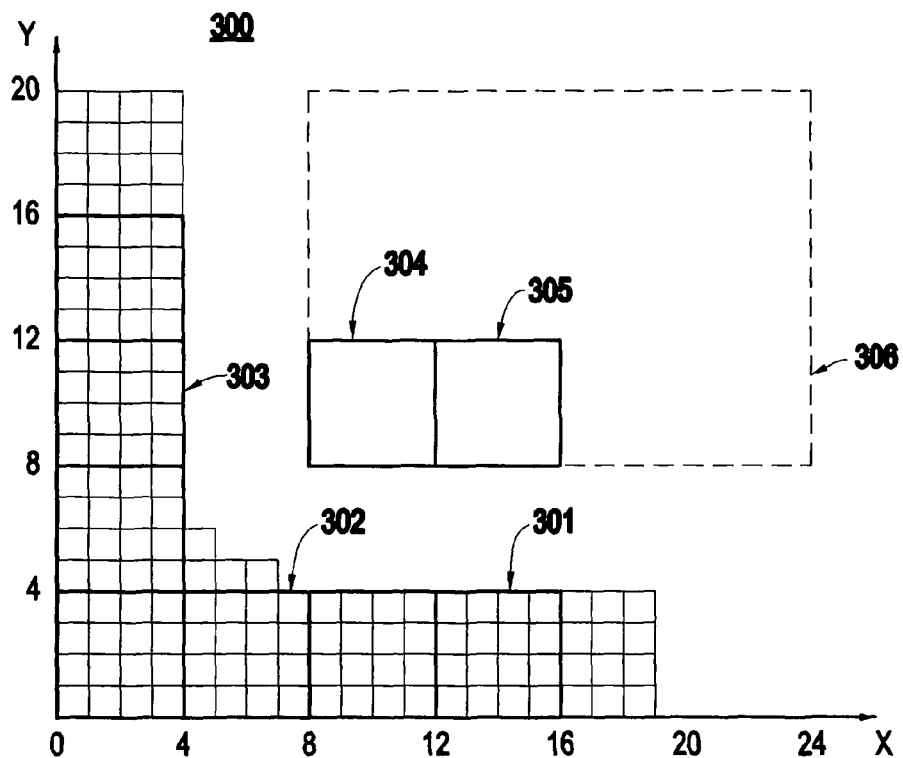
FIG. 3 shows the concept 300 of virtual shingles used for query indexing according to the present invention.

The query index of the present invention is based on virtual shingles. FIG. 3 exemplarily shows the concept 300 of virtual shingles 301-305. Virtual shingles are covering rectangles. Virtual shingles can overlap with each other. There are tradeoff in terms of storage and performance using overlapping shingles. These shingles remain virtual until they are used to cover a range query, at which point, they become activated. It is noted that each shingle 301-305 shown in FIG. 3 is 4×4 and that the shingle size remains constant in the exemplary preferred embodiment.

Additionally, each virtual shingle 301-305 has a unique ID which can be computed systematically, as follows. Assuming that the monitoring region is a rectangle defined by Rx and Ry, then the identification (ID) of a virtual shingle, whose bottom-left corner is located at coordinate (a,b), can exemplarily be computed as: $s(a,b)=b R_x+a$.

Thus, in FIG. 3, wherein monitoring region 306 has size Rx=16 and Ry=12, for virtual shingle 304, having bottom-left corner at coordinate (8,8), the ID for shingle 304 is s(8,8)=8×16+8=136. Similarly, the ID for shingle 305 is s(12,8)=8×16+12=140.

Before a range query can be inserted into the query index, one or more virtual shingles are first found such that the range query is strictly covered. Here, "strict covering" means that the entire query region is completely covered by one or more virtual shingles and that none of these covering shingles is outside the boundaries of the query.

Figure 4:
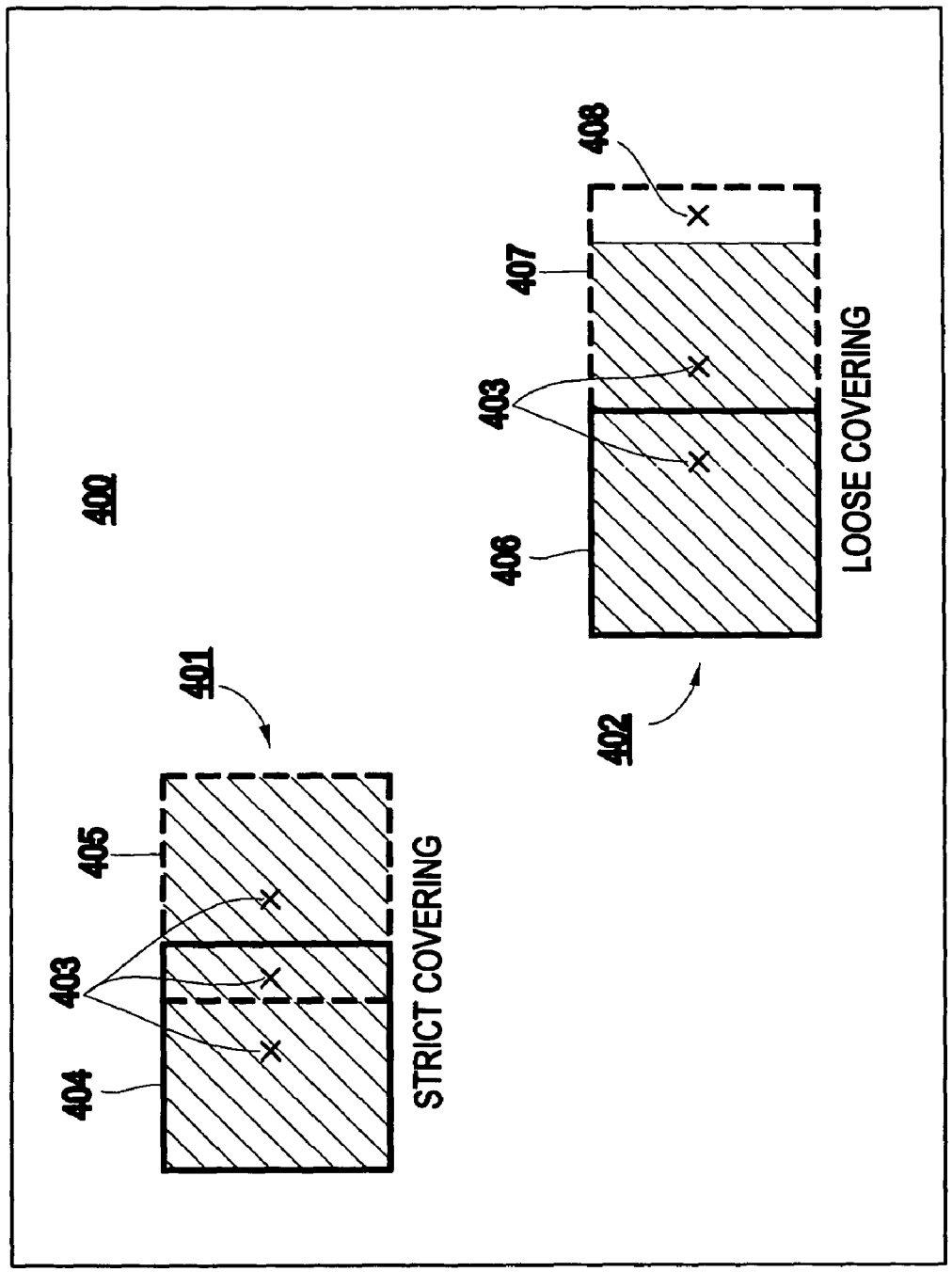
FIG. 4 shows the concept 400 of strict covering 401 versus loose covering 402 of the area shown covered by diagonal lines.

FIG. 4 illustrates the concept 400 of "strict covering" 401 versus "loose covering" 402. The difference is whether any of the covering shingles exceed the query boundaries. That is, in the case of strict covering shown at the top 401 of the figure, covering shingles 404, 405 completely covers the query boundaries and they remain inside the query region, shown in the figure as being the area 403 covered by diagonal lines. In contrast, as shown in the lower portion 402 of the figure, for the shingles 406, 407 covering region 403, at least one shingle (e.g., 407) exceeds the query boundaries in the loosely covering case (e.g., region 408).

Strict covering has an important property that any point covered by a shingle is guaranteed to be also covered by the query. Without strict covering, this property does not exist. For example, a point in region 408 covered by shingle 407 in FIG. 4 is not necessarily covered by the query. However, any point covered by shingle 404 or 405 is covered by the query.

There are many possible ways that a query could be strictly covered with virtual shingles. In this exemplary embodiment, one possible simple and systematic approach is described in reference to FIGS. 5 and 6.

These two FIGS. 500, 600 show an example of covering a range query 501 with one or more virtual shingles, wherein some of them may overlap with one another. For the description of this preferred embodiment, virtual shingles are assumed to be squares with the same size of k×k (e.g., 4×4). It should be apparent that the virtual shingles could be of different sizes and shapes, such as rectangles, from that shown.

Moreover, it is assumed that k is chosen such that it is smaller than or equal to the dimension of the smallest range queries. Namely, all the range queries can be fully covered by one or more virtual shingles. Thus, in FIGS. 5 and 6, k is exemplarily chosen to be 4.

Figure 5:
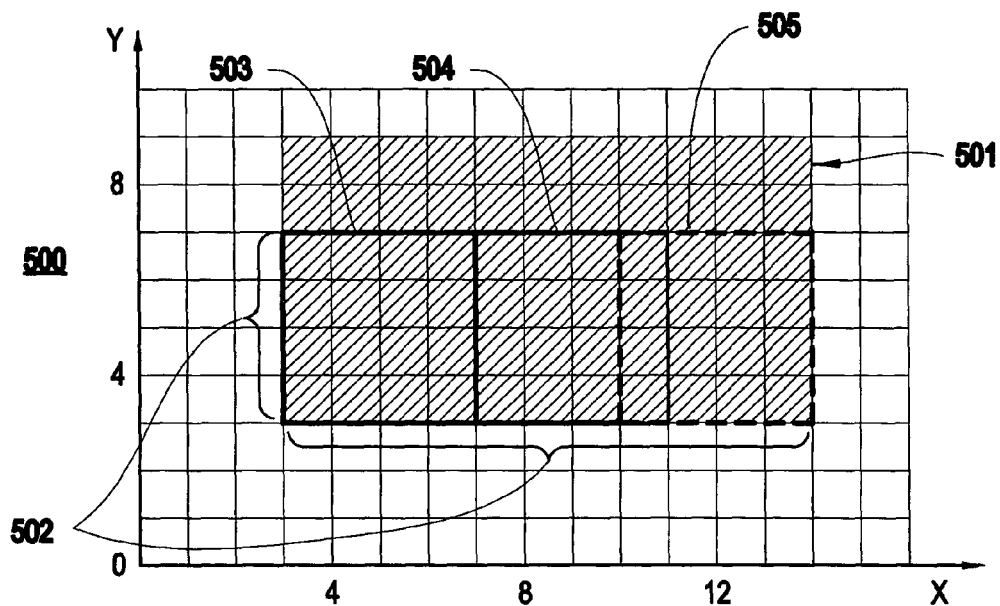
FIGS. 5 and 6 show an example 500 of covering a range query 501, using a concept of strip rectangles and one or more virtual shingles 503-504, 602-604, some of which may overlap each other.

To cover a given range query 501 (e.g., the area covered by diagonal lines), first, as shown in FIG. 5, a strip rectangle 502, having height equal to the height of a virtual shingle (e.g., shingle 503), is generated from the bottom left corner of the query rectangle 501. The strip rectangle 502 can be identified as (3,3,11,4), wherein the symbology (a,b,c,d) of the strip rectangle has the following meaning: (a,b) is the coordinates of the lower left corner of the strip rectangle; c is the length of the strip rectangle; and d is the height of the strip rectangle.

Figure 6:
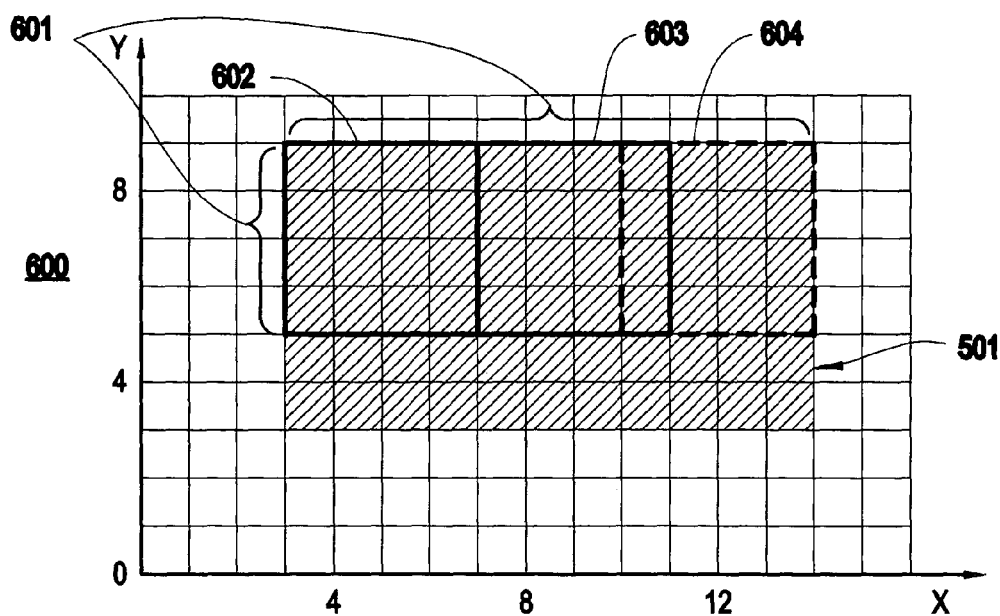

As shown in FIG. 6, the strip rectangle generation then moves upwards to become strip rectangle 601, which would have identification (3,5,11,4). For the final strip rectangle (e.g., strip rectangle 601 in this example), the bottom of the strip rectangle 601 is allowed to overlap with a previous strip rectangle 502. It should be apparent that this overlap of strip rectangles provides strict covering of the range query 501.

Next, for each strip rectangle 502, 601, virtual shingles (e.g., 503-505 and 602-604) are used to cover the strip rectangle, exemplarily starting from the left side and moving towards the right side. For the last shingle (e.g., shingles 505, 604) in each strip rectangle, the right edges of the strip rectangle and the shingle are aligned, thereby allowing the left side of the last shingle to overlap with a previous covering shingle and achieve strict covering of the strip rectangle.

Thus, in FIG. 5, three virtual shingles 503-505 are used to cover the first strip rectangle 502 drawn on the lower part of range query 501. Similarly, in FIG. 6, three virtual shingles 602-604 are used to cover the second strip rectangle 601 drawn on the upper part of the query 501. Those skilled in the art will appreciate that there are many other ways to completely cover a range query with one or more shingles. It should also be apparent that the overlap of the strip rectangles 502, 601 and the overlap of final shingles 505, 604 provide strict covering of the range query 501.

Figure 7:
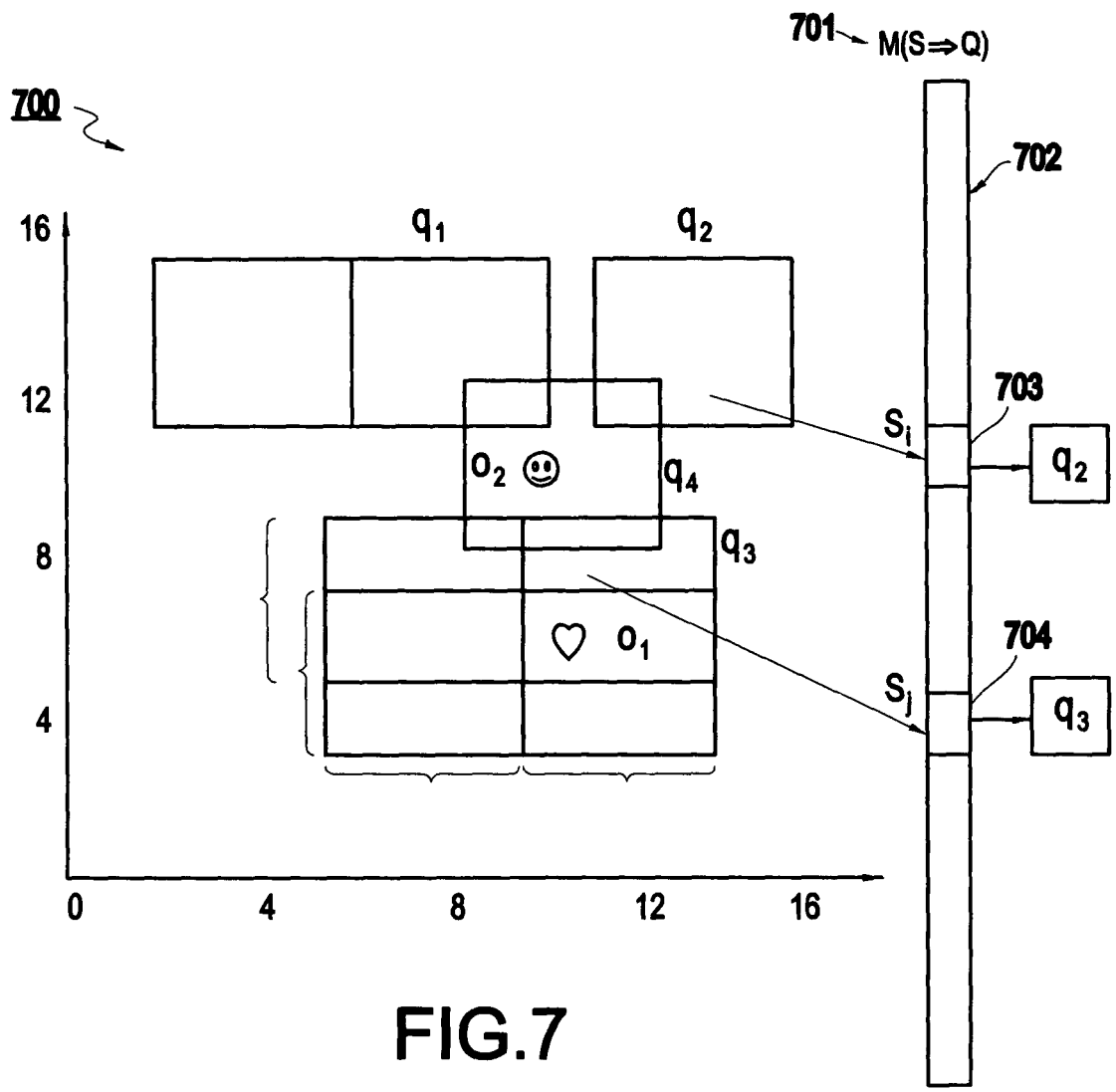
FIG. 7 shows an example 700 of a shingle-based query indexing.

After finding all the covering shingles, a query ID is inserted into ID lists associated with all the covering shingles. FIG. 7 shows one possible shingle-based query indexing scheme 700. Essentially, the query index maintains a mapping 701 from each virtual shingle $s_k$ to a list 702 of IDs of queries $q_i$. That is, list 702 is an array of pointers to the queries 703, 704. Let QL(s) denote the set of query IDs associated with a virtual shingle s. It contains all the queries that s covers. Hence, if a virtual shingle is not used to cover any range query, then the corresponding ID list is empty. As an example, in FIG. 7, queries $q_1$-$q_4$ are covered completely by various virtual shingles. Some of them overlap with each other. The query IDs are stored in the corresponding ID lists so that, for example, pointers 703, 704 point respectively to query $q_2$ for shingle $S_i$ and query $q_3$ for $S_j$.

To search all the queries that cover an object location, all the virtual covering shingles must first be found. Let $CS^v(o)$ denote the set of virtual covering shingles for object o (e.g., object $O_1$, $O_2$ in FIG. 7). From these virtual covering shingles, all the queries stored in the corresponding QL(s) (e.g., 703, 704) must be found for every $s \in CS^v(o)$.

Figure 8:
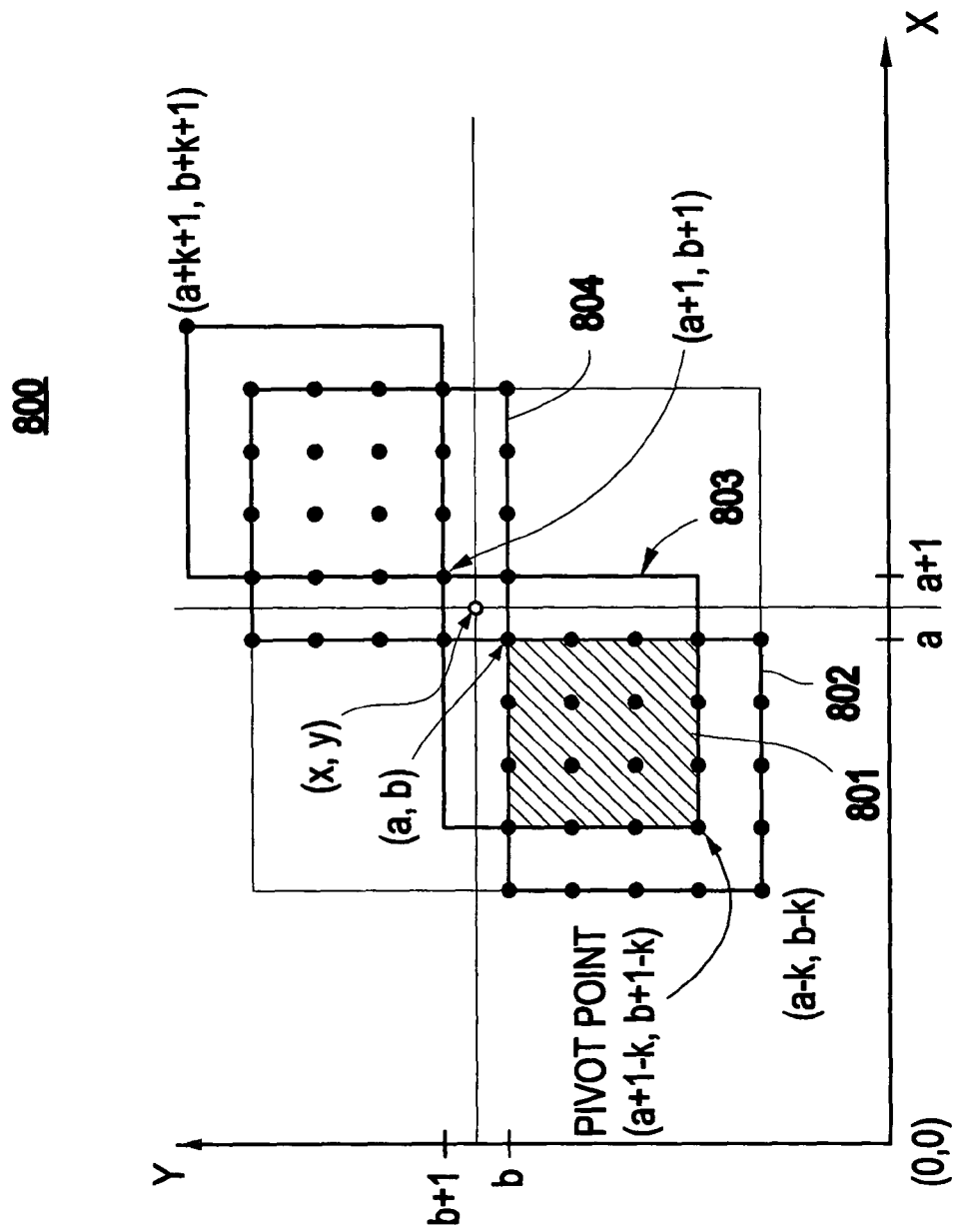
FIG. 8 shows an example 800 of finding the covering shingles for any object location.

FIG. 8 shows an exemplary method 800 of finding all the covering shingles for an object o whose location is at (x, y), where a<x<a+1, and b<y<b+1. All the covering shingles can be systematically enumerated from FIG. 8, as follows: their bottom-left corners are located in the shaded area 801. This shaded area 801 is defined by the intersection of two shingles 802, 803 whose upper-right corners are at (a, b) and (a+1, b+1), respectively. In total, there are 16 such possible covering shingles as shown in FIG. 8 (e.g., if each point in the shaded area 801 had an associated shingle). The smallest ID of these covering shingle is s(a+1−k, b+1−k), labeled in FIG. 8 as shingle 803. The largest ID is s(a, b), labeled in FIG. 8 as shingle 804.

Figure 9:
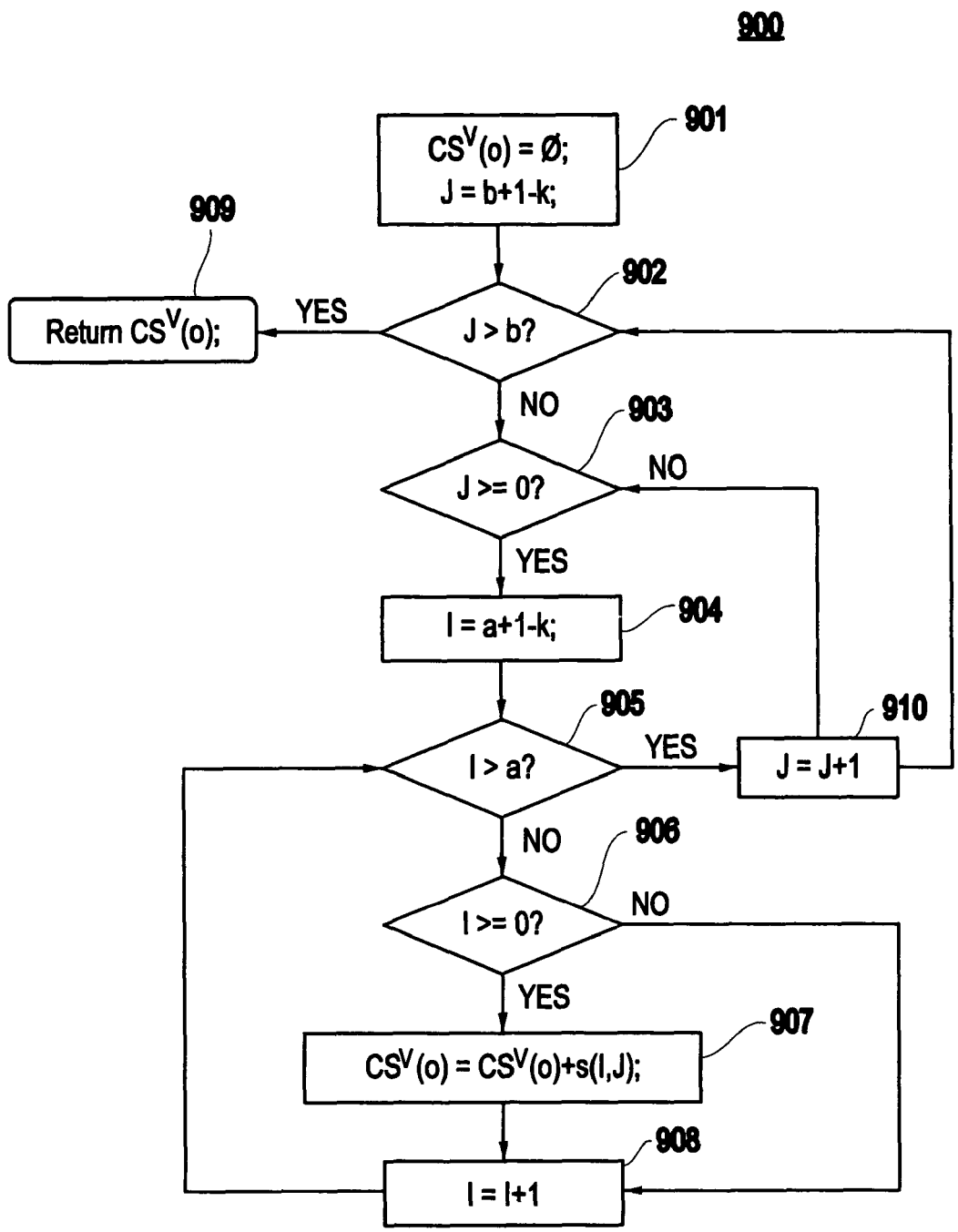
FIG. 9 shows the flow chart 900 of an exemplary algorithm for enumerating all the covering shingles for an object location.

FIG. 9 shows an exemplary flow chart 900 for systematically enumerating the set of covering shingles, $CS^v(o)$, for an object o whose location is at (x, y), where a<x<a+1, and b<y<b+1. First, in step 901, the covering shingle set is initialized as an empty set and J is initialized to be b+1−k. Then, in step 902, it is checked if (J>b) is true. If yes, in step 909, the routine ends and $CS^v(o)$ is returned.

If not, then in step 903, it is further checked if (J>=0) is true. If not, in step 910, J is incremented by 1. Otherwise, in step 904, I is initialized to be a+1−k. In step 905, it is checked if (I>a) is true. If yes, in step 910, 1 is added to J. If not, in step 906, it is further checked if (I>=0) is true. If yes, in step 907, the shingle s(I, J) is added to $CS^v(o)$. In step 908, 1 is added to I. In step 906, if (I<0), the routine skips to step 908. After I is incremented in step 908, the routine returns to step 905.

Those skilled in the art will appreciate that the size of the covering shingle set of any object location remains constant so long as that location is not in the boundary regions. The boundary regions are defined by $0 \leq x \leq k$, Rx−k$\leq$x$\leq$1Rx, $0 \leq y < k$, or Ry−k$\leq$x<Ry. This can easily be verified by moving around the object in FIG. 8. The relative positions of the covering shingles may change, but the size of the shaded area 801 remains the same.

Figure 10:
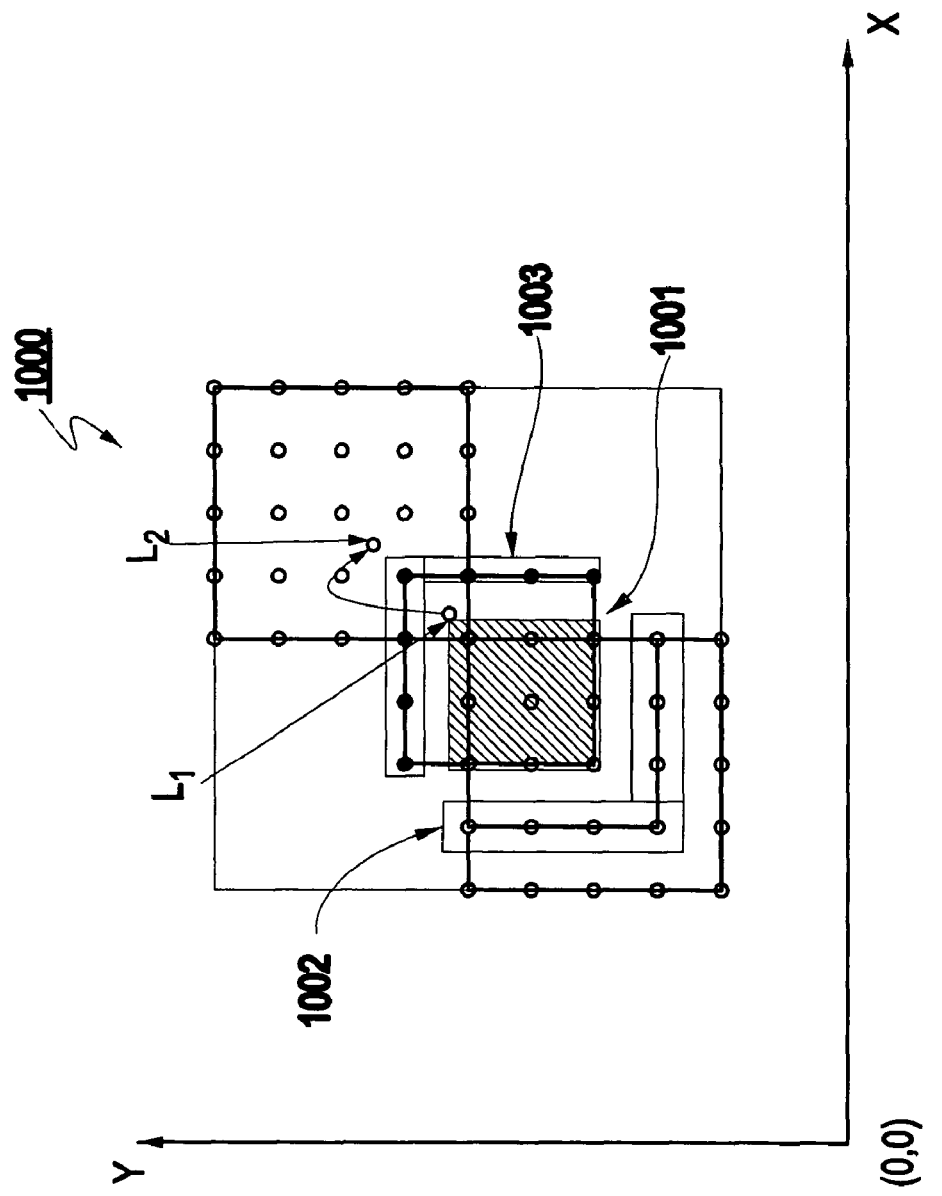
FIG. 10 shows an example 1000 of incremental query evaluation once an object moves to a new location.

The concept illustrated by shaded area 801 in FIG. 8 can be utilized in determining which shingles are involved when an object moves. That is, given the exemplary procedure for enumerating all the covering shingles for an object location, an exemplary incremental query reevaluation is illustrated by FIG. 10. This figure shows an example of saving certain query evaluation when an object moves from one location to another, exemplarily shown as location L1 to location L2. In general, when an object moves, the set of covering shingles for the new location $CS^v_{new}(o)$ and that for the old location $CS^v_{old}(o)$ may have overlapped. Namely, there are certain shingles that belong to both sets.

For those covering shingles belonging to both sets, no computation is needed. This is because the moving object has not moved outside the boundaries of these covering shingles. However, for those shingles that belong to $CS^v_{new}(o)$, but not to $CS^v_{old}(o)$, the object ID needs to be inserted into the corresponding queries that those shingles cover. On the other hand, for those shingles that belong to $CS^v_{old}(o)$, but not to $CS^v_{new}(o)$, the object ID needs to be deleted from the corresponding queries covered by those shingles.

FIG. 10 shows the regions of interest as an object from location L1 to L2, given the environment shown in FIG. 8. That is, in FIG. 10, the location L1 corresponds to location (x,y) in FIG. 8. New location L2 in FIG. 10 is approximately one unit away. Therefore, it should be intuitive that the 4×4 shaded area 801 in FIG. 8 will now shift according to the new location L2. This shift in location of the 4×4 shaded area is shown in FIG. 10, except that the 4×4 area can now be broken down into three areas.

In the first area 1001, this is the 3×3 square that is shared by the 4×4 area 801 shown in FIG. 8 and the new 4×4 area corresponding to the new location L2. In this 3×3 square 1001 are represented all covering shingles where no action is needed for the object identification list.

Area 1002 is the section of the 4×4 shaded area 801 that has been vacated by location to L2. This area 1002 represents those covering shingles for which a deletion in the object identification list needs to be executed.

Finally, area 1003 in FIG. 10 represents the newly-added section of the 4×4 square. That is, in area 1003 is represented those covering shingle for which an insertion in the object identification list needs to be executed.

Figure 11:
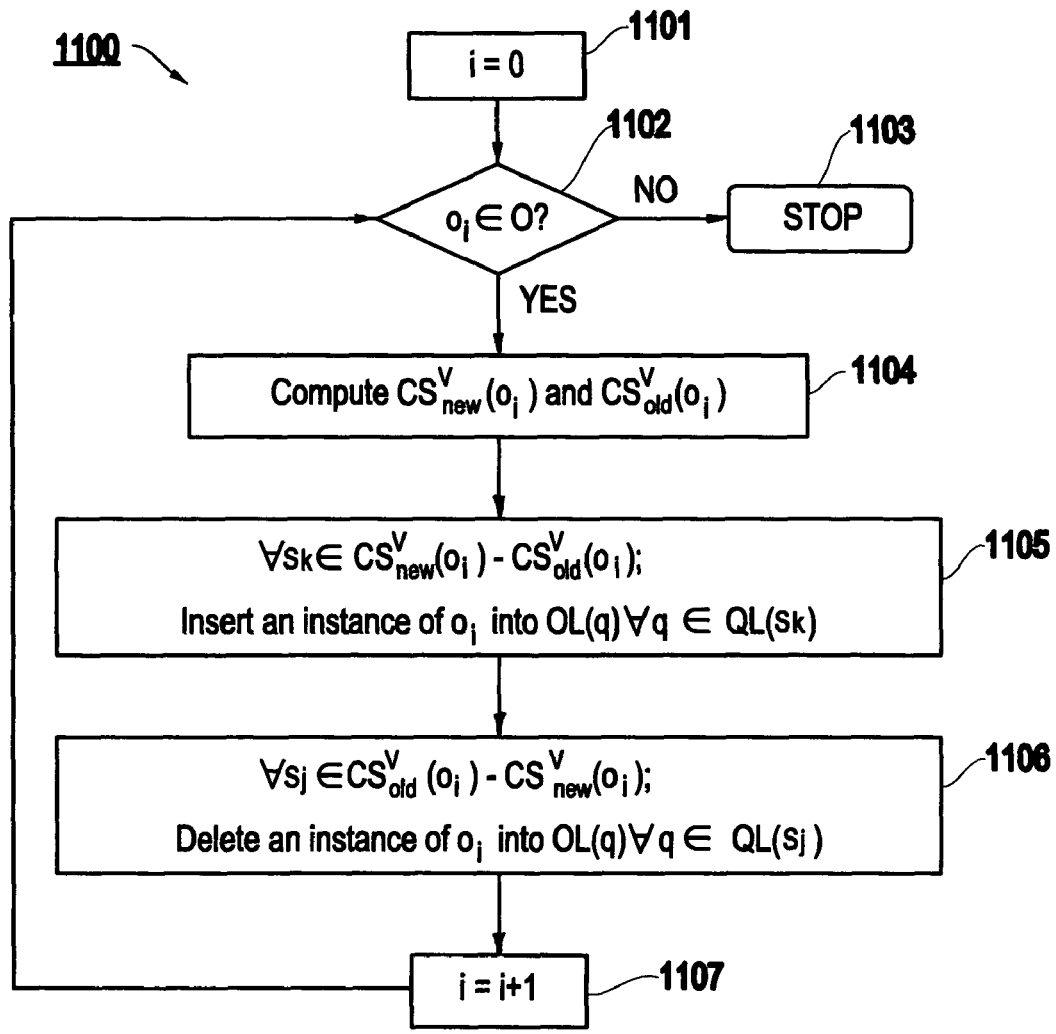
FIG. 11 shows the flow chart 1100 of the algorithm for incrementally evaluating queries by skipping certain computations.

Therefore, based on the concepts shown in FIG. 10, a flow chart 1100 of an exemplary routine for an incremental reevaluation of queries by filtering out certain computations is shown in FIG. 11. The query reevaluation is done for every object in O, which is the set of all moving objects. When every object has been examined (e.g., steps 1101, 1101, and 1107), the routine stops in step 1103.

First, for each object, in step 1104, the set of covering shingles for the new and old locations are first computed: $CS^v_{new}(o)$ and $CS^v_{old}(o)$. Then, in step 1105, $\forall s_k \in CS^v_{new}(o) - CS^v_{old}(o)$, an instance of o is inserted into $OL(q)$, $\forall q \in QL(s_k)$. After that, in step 1106, $\forall s_j \in CS^v_{new}(o) - CS^v_{old}(o)$, an instance of o is deleted from $OL(q)$, $\forall q \in QL(s_j)$. It is noted that, $\forall s \in CS^v_{new}(o) \cap CS^v_{old}(o)$, no action is needed.

Those skilled in the art will appreciate that range queries may move around, similar to the objects. In such cases, the old range queries are removed from the query index first and the new range queries are inserted. Then, the objects are similarly used to find all the covering range queries in order to periodically reevaluate the query results.

It should also be apparent that various kinds of services can be provided based on the system and method disclosed in this current invention. As a first example, a service can be offered to a taxi cab company to dispatch a taxi to a customer asking for such a service. The service provider would monitor the taxi cabs as moving objects. Their locations are reported to the service providers periodically.

One or many taxi stops, such as hotels or restaurants, and the ranges surrounding these stops could represent range queries of the present invention. The service provider would repeatedly maintain the taxi cabs currently within the range queries using the system and method disclosed in the present invention. Such query results can be provided to the taxi cab company to appropriately dispatch taxi cabs to customers who are calling from one of the stops.

In another example, a service based on the system and method of the current invention could be provided to one or more stores for the purpose of allowing these stores to dynamically send electronic coupons to customers with cell phones or PDAs who are currently approaching the stores. In this example, the stores and their desired ranges are the queries. Customers with cell phones or PDAs are moving objects. A service provider can monitor these moving objects against the stores and their range queries. A store owner who wants to send e-coupons to the customers currently around its store can take advantage of such a service.

However, it should be apparent that these examples above are only two possible applications of the present invention and are not intended as limiting the present invention in any way. The present invention provides a computerized technique of monitoring moving objects and, returning back to the block diagram of FIG. 1, will be of interest to any of the levels of users or implementation shown in FIG. 1. Thus, a consumer of the present invention could be considered as the end user represented as the moving objects 120-128 being tracked by the technique described by the present invention, as an operator of a service (e.g., taxi company) or store (e.g., for electronic coupon distribution) that utilizes the result of the query, or as the service provider 150, 151 that directly executes the present invention either for its own use or for forwarding to clients such as a taxi company. Under certain conditions, it is possible that the owner/operator of the object tracking system (e.g., shown as satellite 101), the wireless reception facility 130, 131, or even the computer network 140 might be considered as the consumer of the present invention.

Exemplary Hardware Implementation

FIG. 12 illustrates a typical hardware configuration of an information handling/computer system 1200 in accordance with the invention and which preferably has at least one processor or central processing unit (CPU) 1211.

The CPUs 1211 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer 1239 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1211 and hardware above, to perform the method of the invention.

This signal-bearing media may include, for example, a RAM contained within the CPU 1211, as represented by the fast-access storage for example. Alternatively, the instructions may be contained in another signal-bearing media, such as a magnetic data storage diskette 1300 (FIG. 13), directly or indirectly accessible by the CPU 1211.

Whether contained in the diskette 1300, the computer/CPU 1211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of monitoring continual queries over moving objects, said method comprising:
   preliminarily establishing, using a processor on a computer, an object identification listing for each of an object being monitored, said object identification listing providing an indication of which shingles cover an object and which query region includes these shingles, said object identification listing to be updated as said object moves;
   storing coordinates defining a query region in a memory;
   for each query region, retrieving, from said memory, said coordinates of said query region representing a continual query over which movements of moving objects are to be monitored and constructing, using said processor of said computer and said retrieved coordinates, a covering for said query region, said covering comprising at least one shingle, so that said query region is completely covered by said at least one shingle and no section of any said at least one shingle falls outside said query region;
   periodically, throughout a period of said continual query monitoring, receiving location information for each said object being monitored;
   determining from said location information whether any said object is covered by any of said shingles of said query region; and
   updating said object identification listing based on said determining, thereby also reflecting an updating of said moving objects relative to said query regions.

2. The method of claim 1, wherein, when said at least one shingle strictly covering a query region comprises a plurality of shingles, the shingles in said plurality are allowed to overlap.

3. The method of claim 1, wherein said shingles are all one predetermined shape.

4. The method of claim 1, wherein the query regions comprise predetermined geographical areas on the earth's surface and said shingles comprise at least one of:
   two-dimensional shapes; and
   three-dimensional shapes.

5. The method of claim 1, further comprising:
   for a query region, determining, using said processor, an optimal shingle size for said query region.

6. The method of claim 5, wherein said strictly covering said query region comprises:
   forming, using said processor, a first strip rectangle based on said optimal shingle size, said first strip rectangle aligned along an edge of said query region in a first dimension.

7. The method of claim 6, wherein if said first strip rectangle fails to strictly cover said query region, said method further comprising:
   relative to a second dimension, using said processor to form a second strip rectangle based on said optimal shingle size.

8. The method of claim 7, wherein said optimal shingle size allows said second strip rectangle to strictly cover said query region.

9. The method of claim 8, wherein said first strip rectangle and said second strip rectangle overlay in order to achieve a strict covering of said query region.

10. The method of claim 7, wherein if said optimal shingle size does not permit said second strip to strictly cover said query region, said method further comprising:
    in said second dimension, using said processor for repeatedly forming a strip rectangle based on said optimal shingle size until said query region is completely covered by strip rectangles, wherein a final strip rectangle is allowed to overlap a previous strip rectangle to achieve said strict covering.

11. The method of claim 6, further comprising:
    forming shingles, using said processor, in said first strip rectangle, each said shingle based on said optimal shingle size, so as to strictly cover said first strip rectangle.

12. The method of claim 1, wherein a strict covering of said first strip rectangle is achieved by allowing a last shingle in said first strip rectangle to overlap a previously-placed shingle.

13. The method of claim 7, further comprising:
    for each strip rectangle formed, using said processor for forming shingles in said strip rectangle in a manner that strictly covers said strip rectangle.

14. The method of claim 1, further comprising:
    maintaining, in a memory of said computer, a query index of objects that are located in each query region, as based on which shingles currently cover the objects of interest.

15. The method of claim 14, wherein certain query evaluations are skipped by filtering out a subset of said objects of interest that have not moved from a shingle previously covering the object.

16. A system of monitoring continual queries over moving objects, said system comprising:
    a module executed on a computer that receives coordinates defining one or more query regions, constructs a cover that strictly covers each query region with at least one covering shingle, each said query region being a region represented in a digital format over which said objects are to be continually monitored, wherein the strictly covering function comprises completely covering a query by at least one said covering shingle, wherein none of said shingles strictly covering said query extends outside said query, and each said shingle strictly covering said query is permitted to overlap another shingle strictly covering said query, and determines whether any object being monitor is currently covered by any of said covering shingles, wherein said determining is repeated in a repetitive manner as updated current locations of objects are received, thereby providing updates of movements of said objects relative to each said query region.

17. The system of claim 16, further comprising:

a calculator, executed on said computer, that skips certain query evaluations by filtering out a subset of said moving objects using said strictly covering shingles.

18. The system of claim 17, wherein said calculator further constructs a query index based on said covering shingles and said filtering out a subset of moving objects is based on said query index.

19. The system of claim 17, wherein said filtering out a subset of said moving objects is based on determining a relative movement since the last position with respect to shingle boundaries.

20. The system of claim 18, wherein said filtering out a subset of moving objects is based on building of a query index, said calculator further:

predefining a set of shingles;

strictly covering a range query with one or more said shingles; and maintaining the ID of said range query with said covering shingles.

21. The system of claim 17, wherein said filtering out a subset of said moving objects, further comprises:

computing the covering shingles of an old object location;

computing the covering shingles of a new object location;

deleting an object ID instance from object lists associated with the queries that are covered by the covering shingles of the old location but not of the new location; and inserting an object ID instance into object lists associated with the queries that are covered by the covering shingles of the new location but not of the new location.

22. The system of claim 17, wherein the filtering out of a subset of moving objects further comprises:

computing the covering shingles of an old object location;

computing the covering shingles of a new object location; and taking no action for queries that are covered by the covering shingles of both the new and the old locations.

23. A service based on a computerized monitoring of continual queries over moving objects, said service comprising at least one of:

providing a monitoring of moving objects against continual queries, using a computer, each said query being a region represented in a digital format and representing a region over which said moving objects are to be continually monitored, using a method comprising:

receiving coordinates defining at least one query region in a processor of a computer;

constructing a cover strictly covering each said query region by at least one shingle, using said processor, wherein said strictly covering function comprises completely covering a query region by said at least one shingle and no section of any said at least one shingle falls outside said query region;

determining, using said processor, whether any object being monitored is covered by any of said shingles of any of said query regions; and reporting location information of said moving objects based on said determining, wherein said determining and reporting are repeated in a repetitive manner as updated current locations of objects are received, thereby providing updates of movements of said objects relative to said query regions;

providing a result of said monitoring using said computerized method; and using a result of said monitoring using said method.

24. A signal-bearing storage medium tangibly embodying a program of machine-readable instructions executable by a digital processing apparatus to perform a method of monitoring continual queries over moving objects, said method comprising:

receiving coordinates defining one or more query regions, each said query region comprising a region over which said moving objects are being continually monitored;

constructing a cover strictly covering each said query region by at least one shingle, wherein said strictly covering function comprises completely covering said query region by at least one shingle and no section of any said at least one shingle falls outside said query region;

periodically receiving location information of each object being monitor and determining whether each said monitor object is covered by any of said shingles, thereby providing updates on movements of said monitor objects relative to said query regions; and reporting locations of said objects based on said determining.

* * * * *